March 5, 1963 P. M. PILBOUE 3,080,149
FENCE POST AND TIE MEANS
Filed Oct. 10, 1960

INVENTOR
PIERRE MARIE PILBOUE
BY Irwin d. Thompson
ATTY.

United States Patent Office 3,080,149
Patented Mar. 5, 1963

3,080,149
FENCE POST AND TIE MEANS
Pierre Marie Pilboue, Mohon, France, assignor of one-half to Societe Lefort & Cie, Mohon, France, a corporation of France
Filed Oct. 10, 1960, Ser. No. 61,450
Claims priority, application France Feb. 22, 1960
2 Claims. (Cl. 256—57)

This invention relates to a structural element, and more particularly a fencing post, a lattice door frame, and generally speaking to a support of any desired form.

In the particular field of fencing the stakes or posts, which are embedded in the ground at a distance one from another, are usually constituted by an element in the form of an angular or tubular member, against which there bear a series of tensioning wires adapted to support the lattice-work.

The posts usually employed possess numerous disadvantages as follows:

The openings for the passage of the bracing wires are usually produced before the positioning of the post, so that the openings through which a bracing wire is to be passed may be located at different levels in relation to one another owing to the fact that the posts themselves may not have been embedded at an exactly constant depth.

The height of a stretched lattice-work easily varies, by reason of its very nature, by several centimetres in relation to the normal height provided for, so that the upper bracing wire is usually not situated on a level with the upper edge of the lattice work.

The conception of these fencings does not permit of the positioning of the lattice-work in a plane.

The positioning of a bracing wire necessitates its passage through a complete series of openings, which represents a complexity in the assembly, a loss of time and the risk of deterioration of the bracing wire by abrasion, particularly of wires covered with a plastic material.

The posts are not usually protected against corrosion, which is particularly active at the point of the openings.

To overcome certain of these disadvantages posts have already been proposed generally in the form of an angular member having over its entire height an evenly distributed series of projecting portions, between which there engages the bracing wire, or a series of clearances provided in a wing of the angular member, in which the bracing wire engages, means such for example as a hitching member being provided to ensure connection of the bracing wire to the post.

However, this latter method of forming the posts necessitates a comparatively complicated tooling, and no effective measure is provided against corrosion.

The present invention has for its object a structural element, more particularly for fencing, in which all of the disadvantages aforesaid are eliminated, and which is particularly simple to produce.

A structural element according to the invention is of the kind comprising a longitudinal supporting element having over its entire length an aligned series of evenly distributed projections, in such a way as to permit, for example, in the case of a lattice-work fence maintained by bracing wires, the locking of a bracing wire in a hollow defined by two consecutive projections by means of a fixing member embracing the said supporting element, and it is characterised in that the projections are formed by an undulating wire in contact along a line of apices with the said supporting element and made integral with this supporting element, at least primarily, by a coating of plastic material.

A particular embodiment of the invention will now be described, by way of example, with reference to the accompanying drawing, in which FIG. 1 is a perspective view of a piece of a structural element according to the invention.

Figure 1:
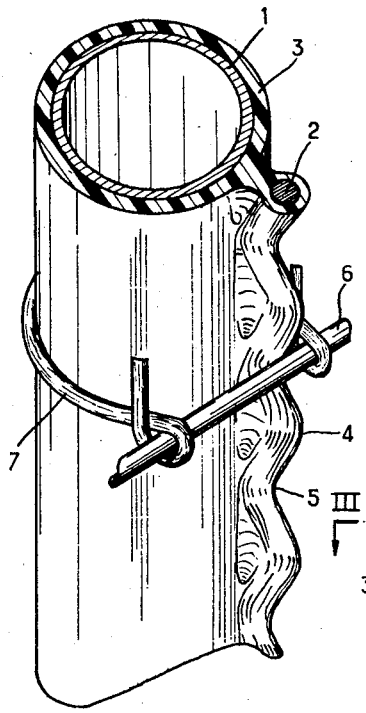
Figure 2:
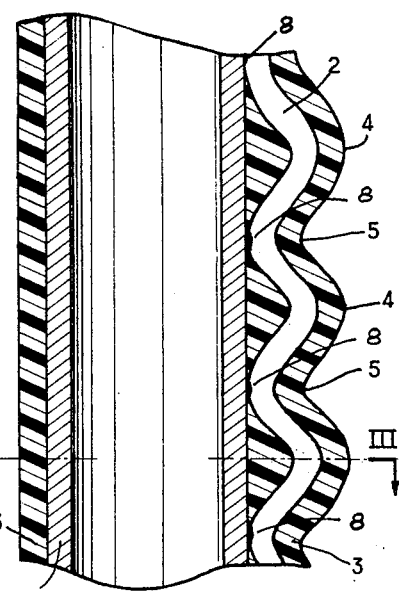
FIG. 2 is a view in longitudinal section of this structural element.
Figure 3:
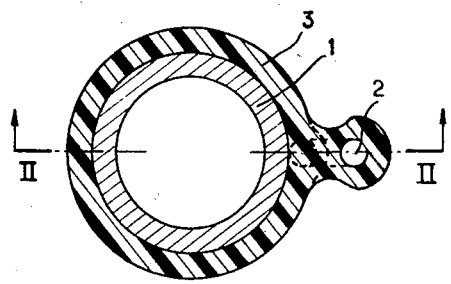
FIG. 3 is a view in section taken along the line III—III in FIG. 2.

According to the form of embodiment selected and illustrated, which relates more particularly to a fencing post, the latter comprises a tubular metallic member 1 acting as a supporting member, along a generatrix of which there is disposed an undulating wire 2, the whole being encased by a layer of plastic material 3, the layer 3 ensuring the integral nature of the composite structural element formed by the tubular member 1 and the wire 2.

The undulating wire 2 determines in its outer vicinity a longitudinally aligned series of bosses 4, between which are formed hollows 5.

The mounting of a tensioning wire 6 is effected by introducing this tensioning wire 6 into a hollow 5 and maintaining it in this position by means of a suitable locking element 7, formed for example by a connecting member embracing the tubular member 1 and the ends of which have been bent back over the wire 6.

The structural element above described may be produced in very simple manner, for example by passing through an extruding head for plastic or rubber material a tubular element 1 and an undulating wire 2 disposed side by side along a generatrix of the tubular element 1.

It will be understood that the upper part of the structural element is protected against rain and humidity by a covering, for example of plastic material.

The invention is in no way limited to the form of embodiment described and illustrated by way of example. It includes all structural elements, irrespective of the profile of the supporting member and hitching means forming a toothed rack, the assembly of which is effected at least by an enveloping coating of plastic material. However, the connection of the fixing members forming the toothed rack may be reinforced by welding points 8 previously judiciously distributed.

In similar fashion the field of application of the structural element according to the invention is not limited to fencing posts, although this application is particularly convenient.

It may also serve as supporting element for different purposes, such for example as coat and hat stands, and in particular for any regulable assembly with neither perforation nor deterioration of the protecting coating.

What I claim is:

1. In a structural element, more particularly a fencing post, a longitudinal tubular supporting element of circular cross-section, an undulating wire of sinusoidal configuration in contact along a line of apices with the said supporting element, a coating of plastic material rendering integral the said supporting element and the said undulating wire, the undulations in the said wire forming an aligned series of evenly distributed projections over the entire length of the said supporting element, and a locking element embracing the said supporting element and adapted to secure a tensioning wire in a hollow defined by two consecutive said projections.

2. In a structural element, more particularly a fencing post, a longitudinal tubular supporting element of circular cross-section, an undulating wire of sinusoidal configuration in contact along a line of apices with the said supporting element and connected thereto by welding points at the points of contact, a coating of plastic material over the said supporting element and the said undulating wire, the undulations in the said wire forming an aligned series of evenly distributed projections over the entire length of the said supporting element, and a locking element embracing the said supporting element and adapted to secure a tensioning wire in a hollow defined by two consecutive said projections.

References Cited in the file of this patent
UNITED STATES PATENTS

| | | |
|---|---|---|
| 837,872 | McCoy | Dec. 4, 1906 |
| 1,044,921 | Schneider | Nov. 19, 1912 |
| 1,418,684 | Story | June 6, 1922 |
| 2,004,629 | Kibler | June 11, 1935 |
| 2,599,493 | Slaughter | June 3, 1952 |
| 2,883,159 | Esmay | Apr. 21, 1959 |
| 2,956,311 | Raydt et al. | Oct. 18, 1960 |